Sept. 21, 1943.  E. HUFF  2,329,905
GRINDING APPARATUS
Filed March 27, 1942  2 Sheets-Sheet 1
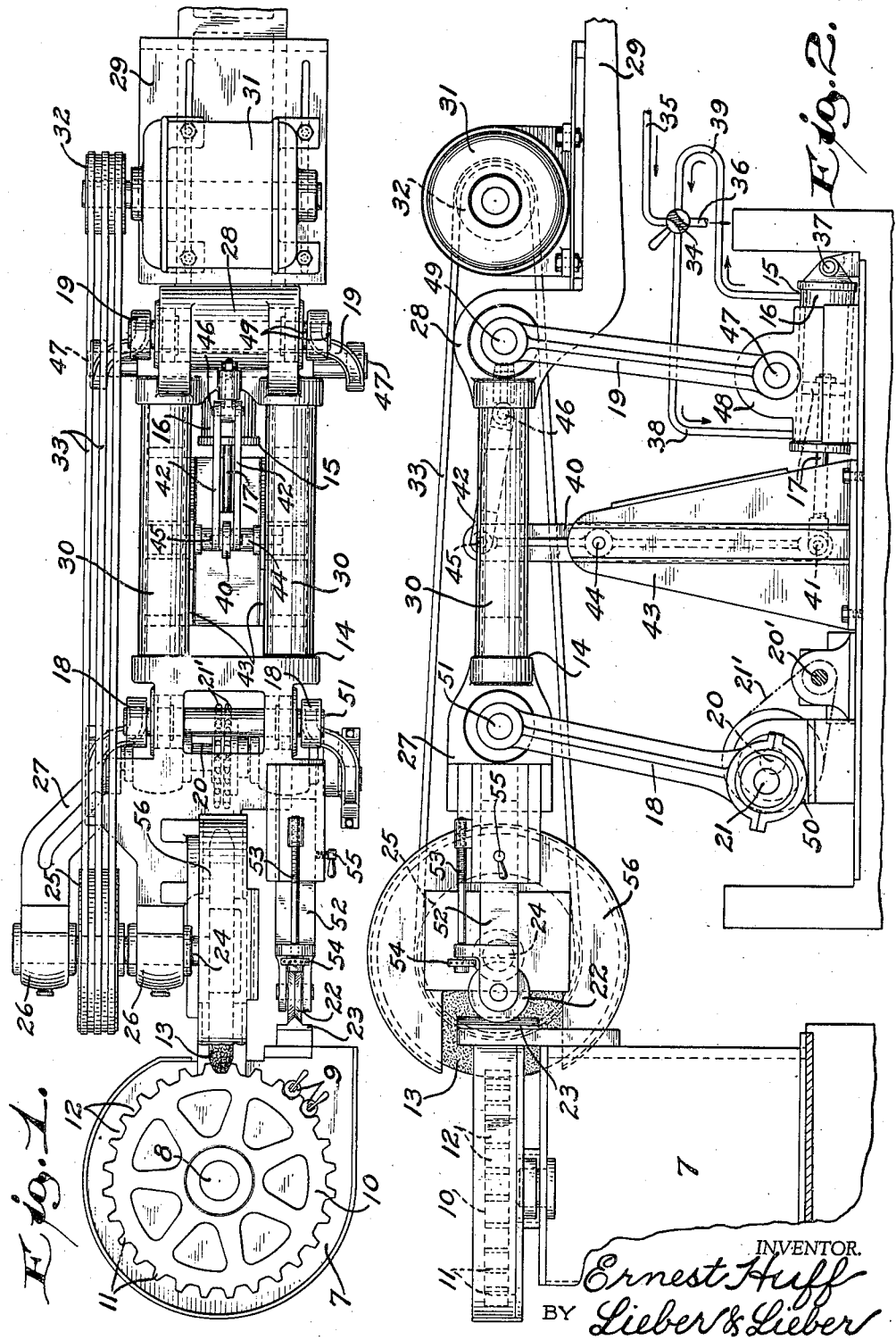
INVENTOR.
Ernest Huff
BY Lieber & Lieber
ATTORNEYS.

Sept. 21, 1943.  E. HUFF  2,329,905
GRINDING APPARATUS
Filed March 27, 1942  2 Sheets-Sheet 2
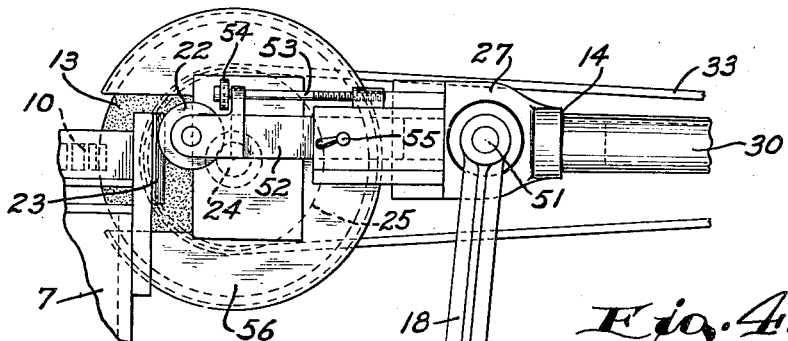
Fig. 4.
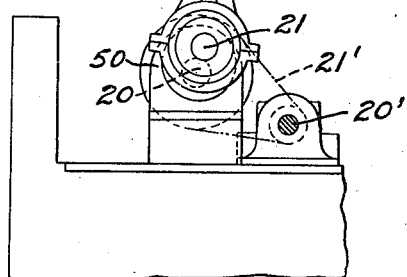
Fig. 3.  Fig. 5.
INVENTOR.
Ernest Huff
BY Lieber & Lieber
ATTORNEYS.
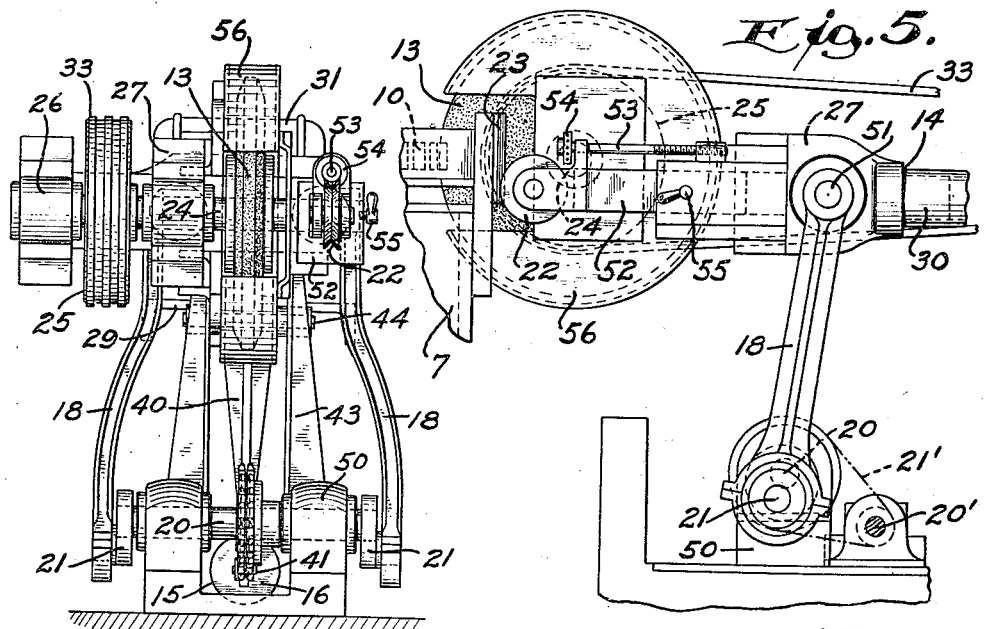

Patented Sept. 21, 1943

2,329,905

UNITED STATES PATENT OFFICE 2,329,905

GRINDING APPARATUS

Ernest Huff, Elm Grove, Wis., assignor to Wehr Steel Company, West Allis, Wis., a corporation of Wisconsin Application March 27, 1942, Serial No. 436,439

12 Claims. (Cl. 51—34)

The present invention relates in general to improvements in the art of forming teeth in machine elements, and relates more particularly to improvements in the construction and operation of apparatus for grinding or dressing the teeth of sprocket wheels or the like.

An object of this invention is to provide improved apparatus for quickly and effectively forming a succession of similar teeth in a machine element such as a sprocket, with the aid of an abrasive wheel and without overheating the machine element being finished.

In my prior Patent No. 2,158,423, granted May 16, 1939, I have shown and described an improved method of and apparatus for grinding successive recesses between the peripheral teeth of a sprocket, by mounting the rough sprocket or sprocket blank upon a movable carriage and by advancing the carriage a definite distance toward the curved periphery of a rotating grinding wheel during the formation of each recess, while simultaneously reciprocating the carriage so as to prevent overheating and possible burning of the sprocket. In this prior device, the sprocket support or carriage was provided with indexing means for effecting accurate rotary adjustment and fixed positioning of the sprocket thereon in successive positions of adjustment, and the carriage reciprocation or motion was produced pneumatically and by means of a spring thus providing a cushioning effect. While this prior method of and apparatus for dressing sprockets is entirely satisfactory in cases where the teeth are not of great width, in the case of relatively wide teeth the curvature of the grinding wheel periphery produces an objectionable medial concavity at the bottom of each recess between adjacent teeth, because of the fact that the sprocket is fed toward the grinding wheel in a radial plane of the latter.

It is therefore a more specific object of my present invention to provide improved means for producing the successive recesses between adjacent teeth of sprockets or the like with straight line generatrices and without such objectionable concavities, regardless of the width of the teeth and intervening recesses.

Another specific object of the present invention is to provide simple, compact and durable apparatus for quickly grinding the recesses between successive teeth of a row, in an accurate and expeditious manner and without danger of scorching or burning the machine element on which the teeth are formed.

Still another specific object of this invention is to provide an improved grinding assemblage especially adapted to automatically dress or finish the teeth of cast sprockets or the like, subject to manual control, and with the aid of pneumatic pressure for urging the grinding element against the work.

A further specific object of the invention is to provide an improved device for rapidly and effectively grinding successive recesses or indentations in a piece of work, in accurately spaced relation and at minimum cost.

An additional specific object of my invention is to provide an improved grinding machine for producing straight grooves in diverse machine elements, and which can be manipulated by a novice.

These and other objects and advantages of the invention will be apparent from the following detailed description.

A clear conception of the various features constituting this improvement, and of the mode of constructing and of operating a grinding machine built in accordance with the invention, may be had by referring to the drawings accompanying and forming a part of this specification wherein like reference characters designate the same or similar parts in the various views.

Fig. 1 is a top view of an improved sprocket grinding machine, with a typical sprocket in position upon the support or carrier;

Fig. 2 is a side elevation of the grinding machine of Fig. 1, showing the grinding wheel in central horizontal position;

Fig. 3 is a front end view of the grinding wheel support of the improved grinding machine;

Fig. 4 is a fragmentary side view showing the grinding wheel at its uppermost limit of vertical reciprocation; and Fig. 5 is a similar side view showing the grinding wheel at its lowermost limit of vertical reciprocation.

While the invention has been illustrated and described herein as being especially adapted for use in grinding the recesses between the peripheral teeth of cast steel sprockets, it is not my desire or intent to thereby unnecessarily restrict the scope or utility of the improvement; and the term "sprocket" as employed herein is intended to include any machine element whether circular or otherwise shaped, and being provided with a series of projections separated by intervening indentations.

Referring to the drawings, the improved sprocket grinding machine shown therein, comprises in general a stationary sprocket support or carrier 7 having thereon a central upright fixed spindle 8 and indexing mechanism 9, both co-operable with a sprocket 10 having peripheral teeth 11 and recesses 12 between the successive teeth; an abrasive tool or grinding wheel 13 rotatably journalled in the front end of an elongated wheel support 14, and being bodily movable by the support 14 toward and away from the periphery of a sprocket 10 resting upon the carrier 7; a compressed air operable servo-motor 15 having a cylinder 16 and a piston 17 reciprocable therein, for resiliently urging the wheel support 14 and the wheel toward and away from the sprocket carrier 7; front and rear lever arms 18, 19 respectively, for movably suspending the wheel support 14; a crank shaft 20 having eccentrics or cranks 21 pivotally supporting the front lever arms 18 and being movable to impart reciprocating motion to the forward end of the wheel support 14; a guiding element or roller 22 secured to the forward portion of the wheel support 14 and being co-operable with an upright rectilinear guide member 23 attached to the sprocket carrier 7, to produce rectilinear reciprocation of the grinding wheel 13 when the cranks 21 are in action; and mechanism for rotating the grinding wheel 13 and for revolving the crank shaft 20.

The sprocket supporting carrier 7 should be rigidly mounted upon a suitable foundation, and the successive toothed blanks or sprockets 10 which are ordinarily formed of cast metal, should have their central hubs bored to snugly fit the centering spindle 8. The indexing mechanism 9 may be of the same type as shown and described in my prior Patent No. 2,158,423, and is adapted to firmly retain each sprocket 10 in successive positions of adjustment with respect to the central axis of the spindle 8, so that the successive final teeth 11 of each sprocket 10 will be spaced equally about the sprocket periphery. The upright guide member 23 which is secured to the sprocket carrier 7, has a V-shaped ridge disposed parallel to the axis of the spindle 8 and along which the guiding roller 22 is adapted to ride; and the sprockets 10 are fixedly secured to the spindle 8 and carrier 7 during each grinding operation but may be freely rotated about or removed vertically from this spindle when the indexing mechanism 9 is released.

The periphery of the grinding wheel 13 should be dressed to produce the desired shape of recesses 12 between the successive teeth 11, and this wheel 13 is detachably secured to the overhanging end of a transverse shaft 24 which is provided with a driven sheave 25 and is journalled for rotation in bearings 26 carried by the elongated wheel support 14. The grinding wheel support 14 extends approximately horizontally toward the sprocket carrier 7, and comprises a front member 27 on which the bearings 26 are mounted, a rear member 28 having a motor platform 29 formed integral therewith, and a pair of parallel tubular members 30 rigidly interconnecting the front and rear members 27, 28. An electric motor 31 for driving the grinding wheel 13 may be adjustably mounted upon the platform 29, and this motor 31 has a driving sheave 32 which is drivingly connected with the driven sheave 25 on the shaft 24, by means of several endless V-belts 33 the tension of which can be varied by adjusting the motor 31 along its supporting platform.

The resilient means or pneumatic servo-motor 15 which is adapted to constantly urge the rigid support 14 and the grinding wheel 13 toward the periphery of a sprocket 10 resting upon the carrier 7 during normal operation of the grinding machine, is disposed beneath the motor supporting platform 29 and may be provided with a control valve 34 and connections for delivering air under pressure to the cylinder 16 on opposite sides of the piston 17 as shown diagrammatically in Fig. 2. The control valve 34 communicates with an air supply line 35 and with an exhaust line 36, and the servo-motor cylinder 16 which is pivotally mounted to swing about a pivot pin 37, is provided with front and rear flexible connections 38, 39 respectively also communicating with the valve 34. The outer end of the rod of the servo-motor piston 17 is pivotally attached to the lower end of a lever 40 by means of a pin 41, and the upper end of this lever 40 is connected with the rear member 28 of the support 14 by means of two links 42, while the medial portion of the lever 40 is swingably suspended from a fixed bracket 43 by a pivot pin 44. The lever 40 and links 42 are disposed between the tubular support members 30 in approximately the same vertical plane as the grinding wheel 13, and the links 42 are attached to the lever 40 and support member 28 by means of pivot pins 45, 46 respectively.

The lower ends of the rear lever arms 19 are swingable upon pins 47 fixedly mounted in bearings 48, and the upper ends of these arms 19 are pivotally attached to the rear member 28 of the grinding wheel support 14 by means of a transverse pin 49. The crank shaft 20 which is provided with the cranks 21 upon which the lower ends of the front lever arms 18 are pivotally suspended, is rotatably supported in fixed bearings 50, and is adapted to be constantly rotated during normal operation of the grinding machine by means of an electric motor not shown, coacting with this shaft 20 through an ordinary speed reducer, counter shaft 20', and chain drive 21'. The upper extremities of the front arms 18 are pivotally attached to the front member 27 of the grinding wheel support 14 by means of another transverse pin 51, and the arms 18, 19 are of rigid construction and of approximately the same length.

The guiding roller 22 which coacts with the fixed upright guide member 23 and co-operates with the cranks 21 to produce rectilinear reciprocation of the grinding wheel 13, is grooved to snugly engage the ridge of the member 23, and is journalled for rotation upon a slide element 52. This slide element 52 is adjustably mounted upon the front member 27 of the wheel support 14 as shown in Figs. 1 and 2, and is adjustable longitudinally of the support 14 to vary the depth of grinding of the sprocket recesses 12, by means of an adjusting screw 53. The front portion of the screw 53 is rotatably journalled in the element 52 and is provided with an adjusting ring 54, and the rear end of the screw 53 has screw thread coaction with the member 27, so that by rotating the ring 54 the roller 22 may be moved bodily either forwardly or rearwardly. A clamping screw 55 may also be provided for the purpose of positively retaining the guiding roller 22 in adjusted position. The rotary grinding wheel 13 should preferably be provided with a suitable guard 56, as shown, and the entire assemblage should be sturdily constructed.

During normal operation of the improved grinding machine, the successive sprockets 10 which are to be ground, may be readily applied to or removed from the upright spindle 8 of the carrier 7 with the aid of an overhead crane, and each sprocket 10 may be conveniently adjusted about the spindle 8 and locked in adjusted positions by utilizing the indexing mechanism 9. The periphery of the grinding wheel 13 should be dressed to produce sprocket recesses 12 of the desired shape, and the adjusting screw 53 should be manipulated to prevent the wheel 13 from traveling too far toward the axis of the spindle 8 and to produce recesses 12 of proper depth.

After a sprocket 10 has been properly positioned upon the carrier 7, the control valve 34 of the servo-motor 15 may be positioned as shown in Fig. 2, whereupon compressed air will be admitted from the supply line 35 past the valve 34 and through the connection 38 to the front displacement chamber of the servo-motor 15, and air will simultaneously be exhausted from the rear displacement chamber through the connection 39 and past the valve 34 to the exhaust line 36. This admission of compressed air to the front displacement chamber will cause the piston 17 to swing the lever 40 in a counter clock-wise direction as viewed in Fig. 2, and will thereby resiliently urge the wheel support 14 and the grinding wheel 13 toward the periphery of the sprocket 10. The grinding wheel 13 will then become effective to form one of the recesses 12, and during the time that the grinding wheel is being resiliently urged toward the sprocket 10, the revolving cranks 21 will constantly swing the support 14 about the rear pin 49 and will thus simultaneously reciprocate the grinding wheel 13 in an approximately vertical direction. As the recess 12 which is being formed approaches completion, the guide wheel 22 will engage the fixed rectilinear guide 23, and the wheel 13 will thus be definitely confined to rectilinear reciprocation across the face of the sprocket 10. This rectilinear reciprocation of the wheel 13 produces a recess 12 having straight line generatrices, and when the grinding operation of one recess 12 has been completed, the valve 34 may be quickly reversed so as to exhaust the air under pressure from the front displacement chamber of the servo-motor 15 and to admit air under pressure to the rear displacement chamber. This reversal of the valve 34 causes the wheel 13 and the wheel support 14 to quickly move away from the sprocket carrier 7, thereby permitting safe subsequent adjustment of the sprocket 10 preparatory to formation of the next recess 12. The operations can thus be repeated until all of the grooves 12 have been properly ground in the sprocket periphery, whereupon the finished sprocket 10 may be replaced by another.

From the foregoing detailed description it will be apparent that the improved grinding machine is extremely simple, compact and durable in construction, and functions to automatically accurately grind the successive recesses 12 in the sprockets 10 in a most effective manner. The compressed air which normally urges the wheel 13 toward the sprocket periphery, serves as a cushion which will permit the wheel to ride over irregularities on the sprocket and to gradually eliminate these irregularities, without danger of scorching or burning the metal of the sprockets. The guide 23 and the roller 22 coacting therewith insure straight or rectilinear grinding of the recesses 12 regardless of the width of the sprocket face, and from Figs. 4 and 5 it will be apparent that the travel of the wheel 13 is considerable and that the reciprocation thereof carries the grinding wheel well beyond the top and bottom of the sprocket. If so desired, several sprockets 10 may be simultaneously ground, by merely providing a supporting spindle 8 of proper length, and the depth of the recesses 12 may be readily varied by merely releasing the clamping screw 55 and by adjusting the ring nut 54. The tension of the belt 33 may also be readily varied by adjusting the motor 31 upon the platform 29, and driving of the grinding wheel 13 is simplified by mounting the driving motor 31 directly upon the same support 14 which carries the grinding wheel. The improved assemblage is readily operable by a novice to produce accurate results, and the invention has proven highly practical and successful in actual commercial use.

It should be understood that it is not desired to limit this invention to the exact details of construction or to the precise mode of operation, herein shown and described, for various modifications within the scope of the appended claims may occur to persons skilled in the art.

I claim:

1. In combination, a sprocket carrier having a sprocket receiving spindle, a grinding wheel support movable toward and away from the periphery of a sprocket mounted upon said spindle, a rotary grinding wheel journalled on said support, front and rear lever brackets having their swinging ends pivotally attached to said support, means for simultaneously swinging said brackets to move said support and said wheel toward the sprocket periphery, and means for additionally moving one of said brackets to reciprocate said wheel.

2. In combination, a sprocket carrier having a sprocket receiving spindle, a grinding wheel support movable toward and away from the periphery of a sprocket mounted upon said spindle, a rotary grinding wheel journalled on said support, front and rear lever brackets having their swinging ends pivotally attached to said support, means for simultaneously swinging said brackets to resiliently urge said grinding wheel against the sprocket periphery, and means for additionally reciprocating one of said brackets to move said wheel back and forth across the sprocket periphery.

3. In combination, a carrier having a fixed sprocket receiving spindle, a grinding wheel support movable toward the periphery of a sprocket mounted upon said spindle, a rotary grinding wheel journalled upon said support, front and rear lever brackets having their swinging ends pivotally attached to said support, a pneumatically operated servo-motor for simultaneously swinging said brackets in the same direction to urge said grinding wheel against the sprocket periphery, and means for reciprocating one of said brackets to move said wheel back and forth across the sprocket periphery.

4. In combination, a carrier having a fixed sprocket receiving spindle, a grinding wheel support movable toward the periphery of a sprocket mounted upon said spindle, a rotary grinding wheel journalled upon said support, front and rear lever brackets having their swinging ends pivotally attached to said support, a pneumatically operated servo-motor for simultaneously swinging said brackets in the same direction to urge said grinding wheel against the sprocket periphery, means for reciprocating one of said brackets to move said wheel back and forth across the sprocket periphery, and means interposed between said carrier and said support for producing rectilinear reciprocation of said grinding wheel during the final grinding operation.

5. In combination, a fixed sprocket receiving spindle, a support movable toward the periphery of a sprocket mounted upon said spindle, a rotary grinding wheel journalled on said support, front and rear levers from the swinging ends of which said support is suspended, means for swinging said levers to move said support and said wheel toward the sprocket periphery, and means for additionally moving said support to reciprocate said wheel.

6. In combination, a fixed sprocket receiving spindle, a support movable toward the periphery of a sprocket mounted upon said spindle, a rotary grinding wheel journalled on one end of said support, a driving motor for said wheel mounted on the opposite end of said support, suspension means coacting with the medial portion of said support between said wheel and said motor for permitting simultaneous movement of said support and wheel and motor toward the sprocket, means for effecting such simultaneous movement of said elements, and means for additionally moving said wheel across the sprocket periphery.

7. In combination, a fixed sprocket receiving spindle, a support movable toward the periphery of a sprocket mounted upon said spindle, a rotary grinding wheel journalled on one end of said support, a driving motor for said wheel mounted on the opposite end of said support, suspension levers coacting with the medial portion of said support, means for swinging said levers to simultaneously move said support and wheel and motor toward the sprocket, and means for additionally moving said support to reciprocate said wheel.

8. In combination, a fixed sprocket receiving spindle, a support movable toward the periphery of a sprocket mounted upon said spindle, a rotary grinding wheel journalled on said support, approximately parallel levers having their swinging ends pivotally associated with said support, means for swinging said levers to move said support and said wheel toward the sprocket periphery, and means for longitudinally moving one of said levers to additionally reciprocate said wheel across the sprocket periphery.

9. In combination, a carrier having a sprocket receiving spindle, a support movable toward the periphery of a sprocket mounted upon said spindle, a rotary grinding wheel journalled on said support, approximately parallel levers having their swinging ends pivotally associated with said support, means for swinging said levers to move said support and said wheel toward the sprocket periphery, and means interposed between said carrier and said support for producing rectilinear reciprocation of said grinding wheel across the sprocket periphery.

10. In combination, a carrier having a sprocket receiving spindle, a support movable toward the periphery of a sprocket mounted upon said spindle, a rotary grinding wheel journalled on said support, approximately parallel levers having their swinging ends pivotally associated with said support, means for swinging said levers to move said support and said wheel toward the sprocket periphery, means for reciprocating one of said levers to move said wheel back and forth across the sprocket periphery, and means interposed between said carrier and said support for producing rectilinear reciprocation of the grinding wheel during the final grinding operation.

11. In comibnation, a fixed sprocket receiving spindle, a support movable toward the periphery of a sprocket mounted upon said spindle, a rotary grinding wheel journalled on said support, spaced levers having their swinging ends pivotally associated with said support, means for simultaneously swinging said levers to move said support and said wheel toward the sprocket periphery, means for longitudinally moving one of said levers to additionally reciprocate said wheel across the sprocket periphery, and means interposed between said spindle and said support for producing rectilinear reciprocation of the wheel during the final grinding operation.

12. In combination, a fixed sprocket receiving spindle, a support movable toward the periphery of a sprocket mounted upon said spindle, a rotary grinding wheel journalled upon said support, a driving motor for said wheel also mounted upon said support, front and rear levers having their upper swinging ends pivotally attached to said support, a servo-motor for simultaneously swinging said levers in the same direction to urge said grinding wheel against the sprocket periphery, means for additionally moving one of said levers to reciprocate said wheel across the sprocket periphery, and means interposed between said spindle and said support for maintaining said reciprocation of the wheel rectilinear during the final grinding operation.

ERNEST HUFF.